United States Patent [19]

Pasman et al.

[11] Patent Number: 5,038,339

[45] Date of Patent: Aug. 6, 1991

[54] RECORD CARRIER HAVING SERVO-TRACK PORTIONS AND SECTOR ADDRESSES HAVING THE SAME PREDETERMINED WIDTH

[75] Inventors: Johannes H. T. Pasman; Nicolaas C. J. A. Van Hijningen, both of Eindhoven, Netherlands

[73] Assignee: U.S. Philips Corporation, New York, N.Y.

[21] Appl. No.: 467,696

[22] Filed: Feb. 20, 1990

Related U.S. Application Data

[60] Division of Ser. No. 257,360, Oct. 12, 1988, Pat. No. 4,949,330, which is a continuation of Ser. No. 735,004, May 17, 1985, abandoned.

[30] Foreign Application Priority Data

Jan. 22, 1985 [NL] Netherlands ............... 8500152

[51] Int. Cl.⁵ .................. G11B 7/24; G11B 7/00
[52] U.S. Cl. .................. 369/275.1; 369/275.3; 369/275.4
[58] Field of Search .......... 369/275.1, 275.3, 275.4, 369/277–279, 284, 286

[56] References Cited

U.S. PATENT DOCUMENTS

| | | | |
|---|---|---|---|
| 4,230,915 | 10/1980 | Dil et al. | 369/275.3 |
| 4,499,574 | 2/1985 | Braat | 369/275.3 |
| 4,535,439 | 8/1985 | Satoh et al. | 369/275.4 |

FOREIGN PATENT DOCUMENTS 2036410 6/1980 United Kingdom.

Primary Examiner—Stuart S. Levy
Assistant Examiner—Hoa Nguyen
Attorney, Agent, or Firm—Leroy Eason

[57] ABSTRACT

A record-carrier body is described, in which a user can record information by means of optical radiation, which record-carrier body has a relief structure of optically detectable servo-track portions and sector addresses. If the maximum width of the servo-track portions and the areas in the sector addresses is at least of the order of half the track period, the servo track portions can be tracked in an optimum manner and the sector-address areas and the information areas recorded by the user provide a read signal of high amplitude.

2 Claims, 2 Drawing Sheets

RECORD CARRIER HAVING SERVO-TRACK PORTIONS AND SECTOR ADDRESSES HAVING THE SAME PREDETERMINED WIDTH

This is a division of prior application Ser. No. 257,360, filed Oct. 12, 1988, now U.S. Pat. No. 4,949,330 which is a continuation of application Ser. No. 06/735,004, filed May 17, 1985, now abandoned.

The invention relates to a record-carrier body in which a user can record information by means of optical radiation, which record-carrier body comprises a substrate and a recording layer on said substrate and has been provided with a preformed optically detectable relief structure of servo-track portions and sector addresses in which address information about associated recordable portions of the record-carrier body is contained in the form of optically detectable areas which alternate with intermediate areas, which areas in the sector addresses have another phase depth than the servo track portions. The invention also relates to an apparatus for recording a structure similar to the relief structure of sector addresses and servo-track portions of said record carrier body.

The record-carrier body may comprise a circular disc-shaped substrate carrying a recording layer in which an optically detectable change can be produced by means of a radiation beam of sufficiently high intensity. The servo track portions may comprise grooves recessed in the substrate surface or ridges on the substrate surface and the sector-address areas may comprise pits formed in the substrate surface or hills formed on this surface. The sector addresses are situated between successive servo-track portions, viewed in the track direction, thus forming one composite track. This track extends over the entire surface area of the recording layer and is preferably a spiral track, but alternatively it may comprise a multitude of quasi-concentric tracks.

When the sector addresses and servo-track portions are exposed to a radiation beam which has been focused to form a small radiation spot, this beam is split into a zero-order subbeam, first-order subbeams and higher-order subbeams. Herein, phase depth is to be understood to mean the phase difference between the zero-order subbeam and a first-order subbeam. This phase depth is determined by the geometries of the sector-address areas and the servo-track portions, inter alia by the depth or the height of these areas and track portions.

Such a record-carrier body is disclosed inter alia in U.S. Pat. No. 4,363,116. As described in this Patent Specification, the servo-track portions are used for detecting and correcting the radial position of a radiation spot formed on the recording layer by a radiation beam when information is being recorded by the user. This enables the requirements imposed on the drive and guide mechanisms by means of which the write beam and the record-carrier body are moved relative to each other to be less stringent, so that the write apparatus can be simpler and cheaper.

Preferably, the radial position of the radiation spot relative to a servo-track portion is detected by means of the "push-pull" or differential method. For this purpose use is made of two radiation-sensitive detectors which are arranged in the path of the radiation beam originating from the record-carrier body and which receive radially different portions of this beam. The difference between the output signals of the two detectors contains information about the radial position of the radiation spot relative to the servo-track portion. If these output signals are identical, the centre of the radiation spot will coincide with the central axis of the servo-track portion. The differential tracking method may be used only if the servo grooves or servo ridges have such a depth or height that their phase depth is of the order of 90°.

The sector-address areas are read using the "central-aperture" or integral method. For this purpose the variation of the total intensity of the radiation issuing from the record-carrier body and traversing an objective system is detected by means of a single detector arranged on the optical axis or by means of the two detectors employed for tracking, whose output signals are then added to each other. For an optimum read-out of the sector addresses the areas therein should have a phase depth of the order of 180°.

It has been found that, in addition to the phase depth, the width, measured in a direction transverse to the track direction of the servo-track portions and the sector address areas, has a substantial influence on the amplitudes of the signals obtained during the recording of the user information. In the record-carrier body in accordance with U.S. Pat. No. 4,363,116, which is intended to be scanned by means of a radiation spot whose half-intensity value is approximately 800 nm, the servo-track portions and the sector-address areas have a width of approximately 600 nm, whilst the period, transverse to the track direction, of the track structure is approximately 1600 nm. If the radiation spot has a Gaussian intensity distribution the half-intensity value is equal to the distance between two points where the intensity is equal to $1/e^2$ of the intensity in the centre of the radiation spot. By means of the known record carrier body it is possible to obtain a differential track signal whose signal amplitude is moderate.

It is an object of the present invention to provide a record-carrier body which, when it is scanned in order to record information, provides an improved differential tracking signal and a satisfactory integral sector-address signal and, when the information areas recorded in the servo-track portions by a user are read in accordance with the integral method, provides an information signal of satisfactory signal amplitude.

The record-carrier body in accordance with the invention is characterized in that the maximum width of the servo-track portions and the sector-address areas is at least of the order of half the period of the tracks in a direction transverse to the track direction.

The term "maximum width" is used because the servo grooves, or ridges, and the sector-address pits, or hills, need not have perpendicular walls but in practice generally have inclined walls. The maximum width is then the width at the location of the recording-layer surface which is most remote from the substrate. The servo grooves and sector-address pits not only have a maximum width but also an effective width. The shallow servo grooves are generally V-shaped in cross-section. For such a groove shape the effective width is equal to half the maximum width. The deeper pits in the sector addresses frequently have a trapezoidal shape. For such pits the effective width is equal to half the sum of the maximum width and the minimum width.

The invention is based on the recognition of the fact that

1. The effective width of the servo-track portion should be substantially equal to half the track period to obtain an optimum tracking signal in accordance with the differential method, 2. The sector-address areas can be read in an optimum manner by means of the integral method if the effective width of these areas is substantially equal to one third of the track period, and 3. The servo track portions should be as wide as possible for an optimum read-out in accordance with the integral method, of the information areas recorded in a servo-track portion in the form of melted-away portions of the recording layer.

Surprisingly, it has been found that for a value of the effective track width between one half and one third of the track period a substantially improved tracking signal is obtained, whilst the signal produced by the sector address areas still has a sufficiently deep modulation.

A second aspect of the invention concerns the apparatus for recording the structure of servo-track portions and sector addresses on a master disc, from which disc a large number of replicas can be made in known manner. Such an apparatus, which comprises a radiation source, a modulator for switching the intensity of the radiation beam produced by the source, and an objective system for focusing the radiation beam to form a radiation spot on the record carrier, is characterized in that optical means are arranged between the radiation source and the objective system to limit the beam which enters the objective system in such a way, in one of two mutually perpendicular directions, that its width is smaller than the width of the entrance pupil of said system. Since the pupil of the objective system is not filled completely in the relevant direction, the dimension of the radiation spot formed by this system is larger in this direction than in a direction perpendicular thereto, so that the radiation spot is elongate.

The said means may comprise known elements, such as a diaphragm, a cylindrical lens and the like.

The invention will now be described in more detail by way of example, with reference to the accompanying drawings. In the drawings.

Figure 1:
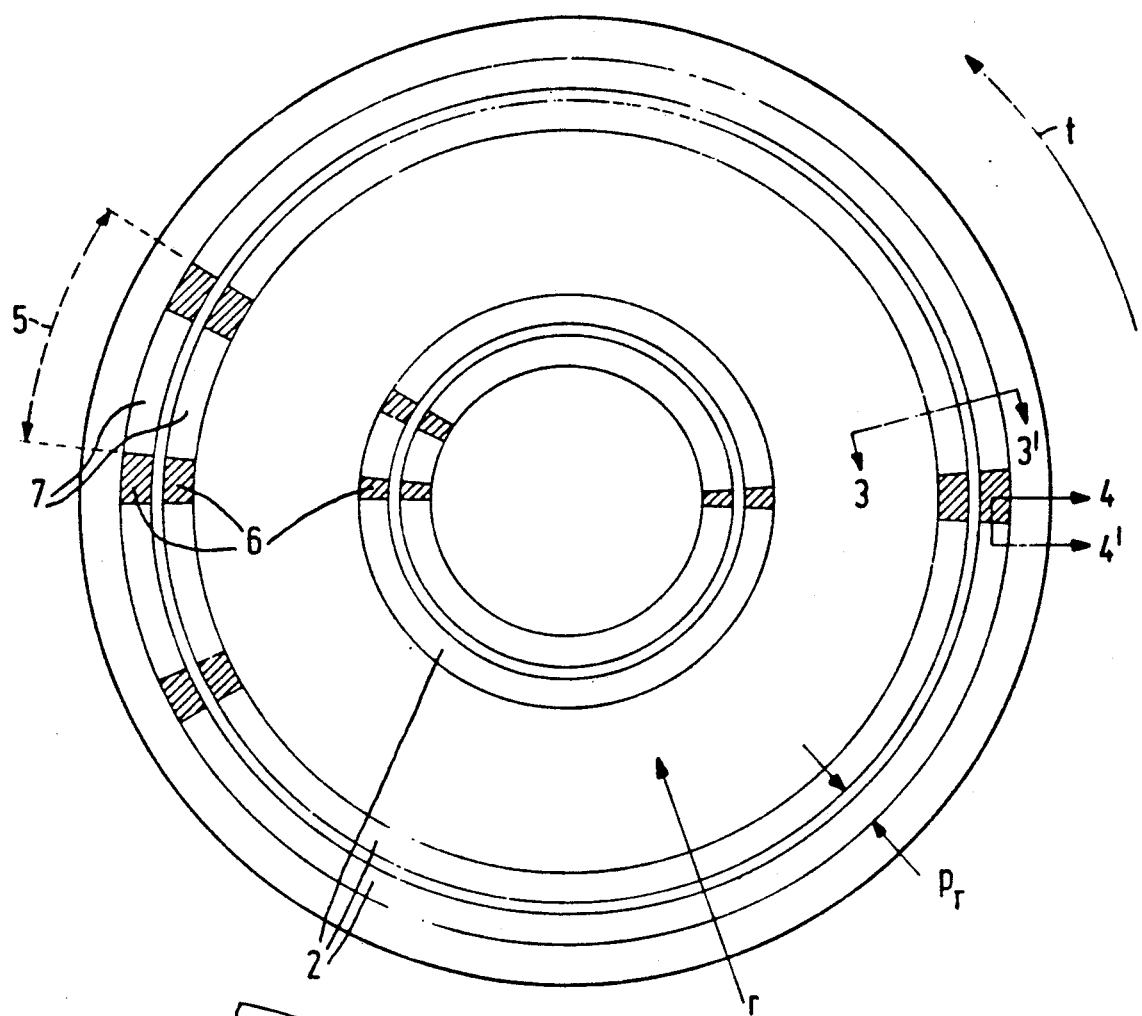
FIG. 1 is a plan view of a record-carrier body.

The record-carrier body 1 in FIG. 1 has for example, a spiral track 2 with a multitude of turns of which only a few turns are shown in FIG. 1. This track is divided into a large number of sectors 5, for example 64 or 128 per turn. Each sector comprises a servo-track portion 7, in which a user can record information, and a sector address 6, in which inter alia the address of the associated servo-track portion 7 is encoded in digital form in optically readable areas 8 shown in FIG. 2. Both these areas and the servo-track portions 7 can be detected optically, so that the desired address can be located before a block of information is recorded, a write spot can be made to follow the servo-track portions accurately both before and during recording. The record carrier body carries a recording layer which is subjected to an optically detectable change when exposed to radiation of sufficiently high intensity.

The manner in which and the apparatus by means of which during the recording of information by the user the addresses are read and the servo-track portions are followed and the manner in which the recorded user information can be read fall outside the scope of the present invention and will not be described herein. For this reference is made to U.S. Pat. No. 4,363,116.

Figure 2:
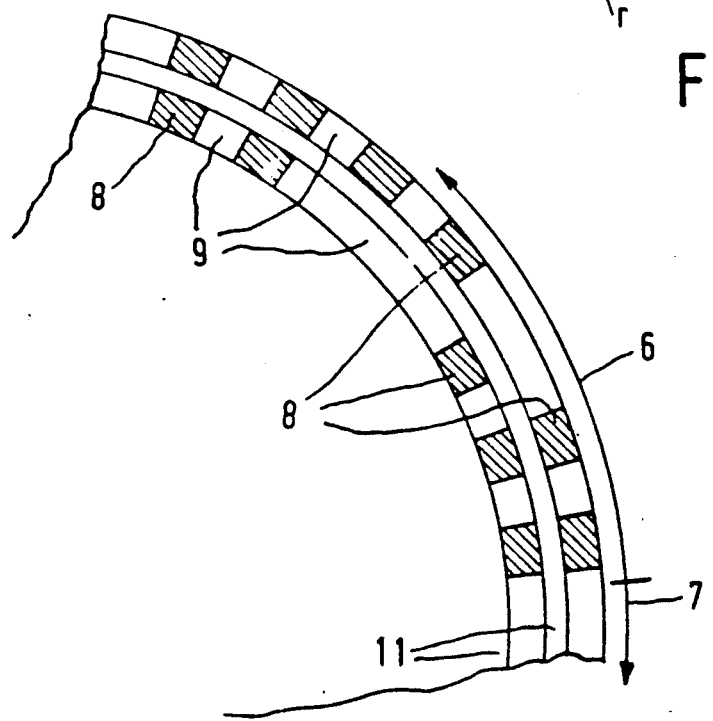
FIG. 2 is a plan view of a small part of two adjacent sector addresses of this record-carrier body.
Figure 3:
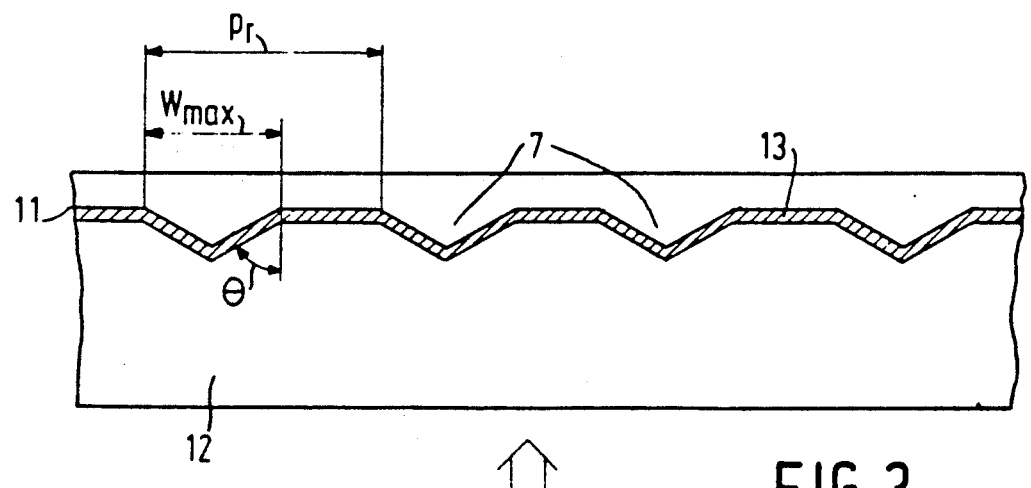
- FIG. 3 is a radial sectional view of a part of the record carrier body in accordance with the invention.

FIG. 2 shows two radially adjacent sectors of the track 2. As is shown in this figure, the sector addresses comprise areas 8, which alternate with intermediate areas 9 in the track direction. Between the successive turns of the track 2 lands 11 are situated at the same level as the intermediate areas 9. The servo-track portions 7 may comprise ridges situated on the same surface as that of the intermediate areas 9 and the lands 11 or, as is shown in FIG. 3, by grooves formed in this surface. In the latter case the sector-address areas comprise pits recessed in said surface, which pits are situated deeper than the servo grooves, as is shown in FIG. 4.

For the sake of clarity it is to be noted that in FIG. 1 the widths of the track 2 and the lands 11 have been exaggerated in comparison with the total surface area of the record-carrier body. In reality the record-carrier body has, for example, a diameter of approximately 30 cm, and a radial period $P_r$, i.e. the period of the track structure in the radial direction r, of, for example, 1600 nm. Moreover, the length of the sector addresses has been exaggerated in comparison with that of the servo-track portions 7. In practice, the length of a portion 7 is, for example, ten times the length of a sector address 6.

FIG. 3 is a radial sectional view of a part of the record-carrier body, taken on the line 3—3' in FIG. 1, at a location where only servo track portions 7 are situated. The servo-track portions 7 comprise grooves formed in the surfaces between the lands 11, which grooves can be followed by means of the differential method. As described in British Patent Specification No. 2,034,097, these grooves have a phase depth of the order of 90°. These grooves are shallow and their walls have a large angle of inclination $\theta$, for example of the order of 80°. The substrate 12 carries a thin recording layer 13. This layer may be a reflecting layer and may contain for example bismuth or tellurium as its principal element. The track structure is then scanned by a beam which is projected from underneath and which traverses the substrate, as is indicated by the arrow 15. Further, a protective coating 14 may be deposited on the recording layer 13.

Figure 4:
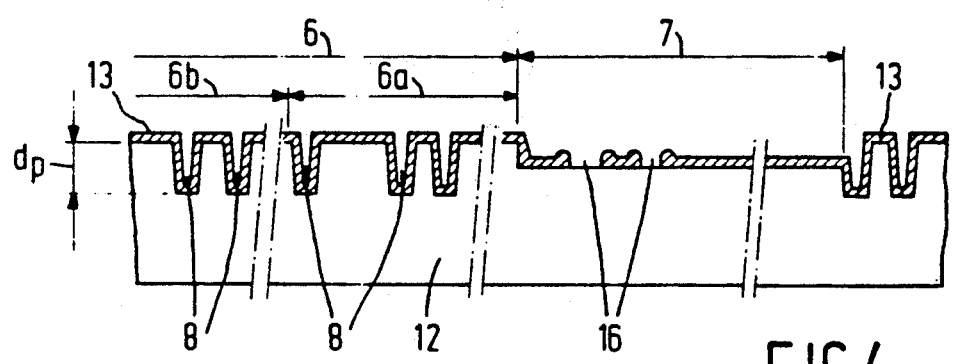
FIG. 4 is a tangential sectional view showing a part of this record-carrier body.

FIG. 4 is a tangential sectional view taken on the line 4—4' in FIG. 1, showing a part of the record-carrier body. As is shown in FIG. 4, each sector address comprises an address portion 6a and a synchronizing portion 6b, which portions each comprise a plurality of pits 8 of uniform dimensions recessed in the substrate. The sequence of pits in the portion 6a represents the address information. The pits in the portion 6b have a fixed spatial frequency and during read-out they produce a clock signal by bymeans of which, it is possible, for example, to control the clock frequency of a signal source which serve from modulating the amplitude of the write beam by means of which the user records the information.

A write beam whose intensity is modulated in conformity with the user information to be recorded can melt pits 16 in the recording layer at the location of the track portions 7, to form information areas whose reflection differs from their vicinity. After this information has been recorded, the user has a record carrier in which the servo-track portions 7 and the sector addresses 6 form a phase structure, whereas the user information has been recorded in the form of an amplitude structure.

In accordance with the invention, as is shown in FIG. 3, the maximum width $W_{max}$ of the servo-track portions 7, i.e. the width at the level of the surface of the lands 11, is larger than half the radial period $P_r$, for example it is equal to or larger than 900 nm in the case of a track period $P_r=1600$ nm. The sector-address areas 8 have the same width. As a result of this value of the width of the address areas 8 and of the servo-track portions 7 the differential tracking signal has a better signal amplitude than the tracking signal obtained by means of the record-carrier bodies known until now, in which the maximum width of the servo-track portions is, for example, 600 nm for a track period $P_r=1600$ nm, and the areas 8 of the sector addresses can still be read satisfactorily using the integral method. Another significant advantage is that for the specified width of the servo-track portions 7 the information areas 16 recorded by the user can be read better by means of the integral method than in the case the servo-track portions 7 have a smaller width. The last-mentioned effect can be explained from the fact that the information areas 16, which differ from the surrounding area in that they have another coefficient of reflection, can be detected better as the groove portions 7 are wider and bear greater resemblance to the flat parts of the recording layer.

The value of the maximum width which is optimum for the adifferential tracking signal and the integral read signal produced by the sector address areas in accordance with the invention is the result of an inventive use of the insights, obtained by means of vectorial diffraction computations, that the amplitudes of the second and higher diffraction orders decrease as the servo-track portion becomes wider and, for the same track depth, the amplitude of a first-order subbeam increases owing to the larger volume of the servo groove or ridge, and, as the maximum servo-track width more closely approximates to the radial period of the track structure, the phase depth, even for larger depths of the servo track, will more closely approximate the optimum value of 90°. It has been found that there is a specific value for the maximum servo-track width, above which the amplitude of the differential tracking signal hardly increases. For a record-carrier body having a period $P_r$ of the order of 1600 nm and scanned with a radiation spot whose half-intensity value is approximately 800 nm, this value is approximately 1200 nm.

However, if the pits or hills of the sector addresses should also have this maximum width, the effective width, which on account of the larger wall steepness of the pits lies close to the maximum width, will be too large for a satisfactory read-out of these pits by means of the integral method. Therefore, a smaller value must be selected for the maximum width of the address areas. It has been found that for a record-carrier body having a period $P_r=1600$ nm, and scanned with a radiation spot having a half-intensity value of approximately 800 nm, good signals are obtained for a maximum width of the address areas in the range from approximately 800 nm to approximately 1000 nm. In general, the maximum width should be at least of the order of half the track period for a correct differential tracking signal and a correct integral read signal of the sector-address areas.

Figure 5:
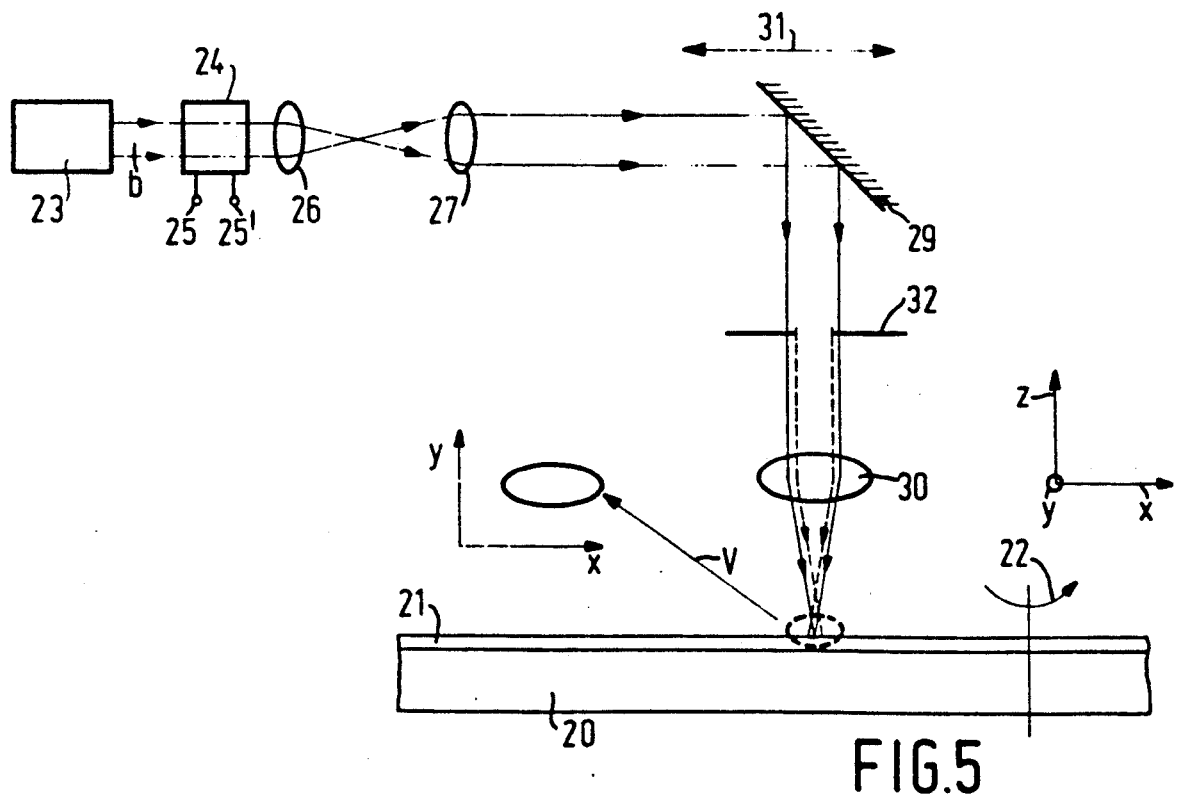
FIG. 5 shows an apparatus in accordance with the invention, for recording a structure of servo-track portions and sector-address areas.

These address areas 8 and the servo-track portions 7 can be formed on the record-carrier body by means of a single radiation spot whose intensity can be switched between two different levels. FIG. 5 shows an apparatus by means of which the sector addresses and the servo-track portions can be recorded on the master disc. In this figure the substrate of the master disc, which is for example made of glass, bears the reference numeral 20. This substrate carries a photo-sensitive layer 21 whose thickness has been selected in such a way that after development of the photo-sensitive layer the sector address areas thus formed have a depth or height in conformity with the wavelength of the beam with which the record-carrier body is to be scanned, so as to obtain the appropriate phase depth. The element 23 in FIG. 5 is a radiation source, for example an argon-ion laser, which produces a beam b having a wavelength of, for example, 457.9 nm. The narrow beam is widened, for example by means of a telescope comprising lenses 26 and 27. A mirror 29 reflects the beam to an objective system 30 having a large numerical aperture, for example 0.4 or 0.5. This objective system focuses the beam b to form a small radiation spot V. The beam may also be widened by means of a lens interposed between the mirror 29 and the objective system.

By rotating the disc about the axis 22 the radiation spot V describes one turn on the disc. For writing a spiral track or a plurality of concentric tracks, the radiation spot V and the disc should be moved in a radial direction relative to one another with a constant velocity or stepwise. For this purpose the mirror 29 and the objective system 30 may be arranged in a housing which is moved in the direction indicated by the arrow 31.

A modulator 24, for example an acousto-optical modulator, by means of which the intensity of the beam can be switched in conformity with the control signal applied to the terminals 25 and 25', is arranged in the radiation path of the beam b. For recording the sector addresses the intensity is switched between a high level and a servo level and for recording the servo-track portions the intensity of the beam has an intermediate level.

The exposure locally increases the solubility of the photo-sensitive layer. The desired relief pattern is obtained by a selective removal of the exposed photo-sensitive material in a developing process. The depth and the width of the servo groove are then determined by the intensity of the beam and by the width of the radiation spot V, respectively. After the master disc has been developed it may be coated with, for example, a silver layer. Subsequently, matrices can be manufactured from this master, in known manner, and are employed for the manufacture of a large number of replicas.

As is shown in FIG. 5, the radiation spot V has an elongate shape, its elongated dimension extending transversely of the track direction. In FIG. 5 the track direction is the Y-direction which extends perpendicularly to the plane of drawing. Such a radiation spot is obtained by illuminating the objective system 30 asymmetrically in such a way that the pupil of the objective system is not filled entirely in the X-direction and the pupil is filled completely in the Y-direction. The dimension of the radiation spot V formed by the objective system is then larger in the X-direction than in the Y-direction. Filling the pupil asymmetrically can be achieved by means of a diaphragm 32 arranged between the mirror 29 and the objective system to limit the beam in the X-direction. As an alternative to a diaphragm a cylindrical lens may be employed, whose cylinder axis extends in the Y-direction. The cylindrical lens ensures that the beam b is converged in the XZ-plane and remains parallel in the YZ-plane.

What is claimed is:

1. A record-carrier comprising a substrate and a recording layer thereon having a plurality of substantially parallel recording tracks performed therein on which information can be recorded by scanning with a write beam of radiation, said tracks having a predetermined track period ($P_r$), each track comprising a relief structure of servo-track portions alternating with sector addresses in the track direction, each sector address including optically detectable areas separated by intermediate areas so as to signify address information for a sector of a track; the servo-track portions and sector addresses producing different phase depths of reflected radiation when a track is scanned by a read beam of radiation; characterized in that:

said servo-track portions and said optically detectable areas of the sector addresses of each track have the same maximum width $W_m$ in a direction transverse to the track, the value of said maximum width $W_m$ being the same for all tracks;

the ratio of said maximum width $W_m$ to said track period $P_r$ has the same constant value for all tracks;

the reflected radiation produced from each sector address by said read beam is adapted for integral detection so as to produce an address signal signifying address information, and the reflected radiation produced from each servo-track portion by said beam is adapted for differential detection so as to produce a tracking signal signifying positioning errors of said read beam with respect to such servo-track portion; and the value of said maximum width $W_m$ exceeds $\frac{1}{2}P_r$ and is less than approximately $\frac{3}{4}P_r$, thereby achieving adequate signal strength of both said differential tracking signal and said integral address signal.

2. A record-carrier as claimed in claim 1, further characterized in that said maximum width $W_m$ is equal to or less than $\frac{5}{8}P_r$.

* * * * *